US008861492B2

(12) United States Patent
Galanis et al.

(10) Patent No.: US 8,861,492 B2
(45) Date of Patent: Oct. 14, 2014

(54) METHOD FOR COMMUNICATION BETWEEN A WLAN TERMINAL AND A HUMAN INTERFACE DEVICE (75) Inventors: Dimitrios Galanis, Patras (GR); Constantinos Pipilas, Patras (GR); Alexandros Maniatopoulos, Patras (GR)

(73) Assignee: Samsung Electronics Co., Ltd (KR)

( * ) Notice: Subject to any disclaimer, the term of this patent is extended or adjusted under 35 U.S.C. 154(b) by 200 days.

(21) Appl. No.: 13/318,027

(22) PCT Filed: Apr. 29, 2009

(86) PCT No.: PCT/SE2009/050462
§ 371 (c)(1),
(2), (4) Date: Feb. 22, 2012

(87) PCT Pub. No.: WO2010/126413
PCT Pub. Date: Nov. 4, 2010

(65) Prior Publication Data
US 2012/0147870 A1    Jun. 14, 2012

(51) Int. Cl.
*H04W 84/12* (2009.01)
*H04W 76/02* (2009.01)

(52) U.S. Cl.
CPC ............ *H04W 76/023* (2013.01); *H04W 84/12* (2013.01)
USPC .......................................... 370/338

(58) Field of Classification Search
CPC ..................................................... H04W 84/12
See application file for complete search history.

(56) References Cited

U.S. PATENT DOCUMENTS

| 2003/0054818 | A1 | 3/2003 | Bahl et al. |
| 2004/0230370 | A1 | 11/2004 | Tzamaloukas |
| 2005/0174962 | A1 | 8/2005 | Gurevich |
| 2006/0073847 | A1 | 4/2006 | Pirzada et al. |
| 2006/0104235 | A1 | 5/2006 | Fritz et al. |
| 2007/0058659 | A1* | 3/2007 | Ayyagari et al. ............. 370/445 |
| 2007/0076597 | A1* | 4/2007 | Barak et al. .................. 370/229 |
| 2008/0175211 | A1* | 7/2008 | Hansen et al. ................ 370/338 |
| 2009/0022092 | A1 | 1/2009 | MacInnis et al. |

FOREIGN PATENT DOCUMENTS

| CN | 1 496 020 | 5/2004 |
| CN | 1 700 677 | 11/2005 |
| WO | WO 2004/032536 A2 | 4/2004 |

* cited by examiner

*Primary Examiner* — Huy D Vu
*Assistant Examiner* — Teisha D Hall
(74) *Attorney, Agent, or Firm* — The Farrell Law Firm, P.C.

(57) ABSTRACT

The exemplary embodiments of the present invention relate to a method and apparatuses corresponding to a WLAN terminal and a wireless human interface device (HID), for enabling communication between the WLAN terminal and HID. According to the method, the WLAN terminal can receive data frames directly from the HID and these frames are compliant with the WLAN standard protocol. The frames are received even if the WLAN terminal is associated with an AP and the HID does not support infrastructure mode.

18 Claims, 9 Drawing Sheets

METHOD FOR COMMUNICATION BETWEEN A WLAN TERMINAL AND A HUMAN INTERFACE DEVICE

TECHNICAL FIELD

The present invention relates generally to the field of digital communications systems, and more particularly to a Wireless Local Area Network (WLAN) terminal, a Human Interface Device (HID) and a method for enabling the WLAN terminal to communicate with the HID over a wireless channel.

BACKGROUND

Wireless communication systems are well known in the art. In general, such systems comprise wireless communication stations which transmit and receive wireless signals between each other. One type of a wireless system known as a WLAN system enables a WLAN wireless host station (WSTA) equipped with a radio transceiver on e.g. a motherboard of the station or a network interface (NIC), frequently as a plug in device, to access an access point of the WLAN system. An access point of a WLAN system is generally a small-size base station which is built according to the IEEE 802.11 standard. The wireless service area of a WLAN access point is often restricted to a geographical area referred to as a hotspot or a small office home office (soho) because the communication range is short or moderate compared to the radio range provided by a base station of a cellular network.

In a WLAN system, WSTAs can operate in an infrastructure mode and/or an independent mode (or ad-hoc mode). In the infrastructure mode, WSTAs conduct communications via the access point after that the WSTAs have associated with the access point (AP). Such a configuration is also known as a Basic Service Set (BSS) mode of operation. It should be noted that a connection between two WSTAs via an AP means that a data frame is transmitted over the wireless channel twice i.e. from the first WSTA to the AP and from the AP to the second WSTA.

In contrast to the infrastructure mode, a WSTA can directly connect to another WSTA without involvement of an AP. This mode of operation is called the independent mode or ad-hoc mode or peer-to-peer mode or independent BSS (IBSS) mode. In this case, a data frame is transmitted over the wireless channel only once i.e. directly from one WSTA to another WSTA without AP involvement, thereby achieving an efficient utilization of the available bandwidth.

The IBSS mode of operation is generally used when there is a need for two or more computing systems in general to exchange data and communication with external world over Internet is not required. This mode of operation can be viewed as more appropriate for a wireless HID (human interface device) that interact with a computing system. An example of a wireless HID is a wireless computer mouse, a wireless keyboard, a wireless headset, a wireless microphone etc. A HID can thus be viewed as a type of device (e.g. a computing device) that is capable in interacting directly with, and most often takes input from, humans and may deliver output to humans.

The radio frequency (RF) communication between a wireless HID device and a WSTA may follow a known standard like Bluetooth, Zigbee and others. A wireless HID with built-in Bluetooth (or Zigbee) transceiver is very popular among the HID industry because such standard offers compatibility among suppliers, low power consumption, adequate throughput data transmission, low cost etc.

However with the advancement in silicon technology and the evolution of WLAN (e.g. Wi-Fi) protocols that address e.g. the power consumption issues, the Wi-Fi technology gains ground in short range wireless communication applications. This means that wireless HIDs based on IEEE 802.11 standard technology need to support a subset of Wi-Fi client functionality in order to e.g. save hardware and software resources etc. Such a wireless HID based on IEEE 802.11 standard can operate in a IBSS mode and thus can directly communicate, using Bluetooth or Zigbee, with a WSTA operating in a IBSS mode. The wireless HID can also operate in a BSS mode, meaning that it can communicate to the WSTA via the AP using the WLAN IEEE 802.11a/b/g/n etc.

However, a problem with a wireless HID without BSS capabilities is that it is not able to connect to a WSTA if the WSTA is already associated with an AP in BSS mode.

In prior art document US 2006/0104235 A1, it is described a method and an apparatus to overcome the above problem. In said prior art document, simultaneous communications in both IBSS and BSS modes is achieved by providing the WSTA with: one state-machine intended for controlling the WSTA in the BSS mode (i.e. infrastructure mode); another state-machine intended for controlling the WSTA in the IBSS mode (i.e. independent mode); and a mixed mode capable in transferring data information in the two modes simultaneously. This means that a HID without BSS capabilities is able to wirelessly connect to a WSTA even if the WSTA is associated with an AP in BSS mode provided that the WSTA supports the mixed-mode operation described above. In other words, a wireless HID can communicate with the WSTA using e.g. Bluetooth or Zigbee (i.e. IBSS mode) and the WSTA can simultaneously communicate and be associated with a AP (i.e. in BSS mode).

A drawback with the above described method and apparatus of the prior art is that the hardware and software complexity is inevitable because the WSTA has to include the above described state machines and the mixed mode means and software means capable in handling the processing of the simultaneous communications. A software upgrade of an existing WSTA (or existing computing system) is not enough to support simultaneous IBSS and BSS modes of operation. In other words, hardware and software changes are required in a WSTA in order to support IBSS and BSS modes. This also means that the power consumption of the WSTA increases since, as mentioned, it requires simultaneous support of IBSS and BSS modes. An increase in power consumption means shorter battery life.

SUMMARY

It is therefore an object of the exemplary embodiments of the present invention to address the above mentioned problems by providing a WLAN terminal, a HID and a method which allows the WLAN terminal of a IEEE 802.11 capable WSTA to receive data frames compliant with the WLAN (i.e. IEEE 802.11) standard protocol, from a wireless HID even when the WLAN terminal is associated with a AP in an BSS (or infrastructure) mode. The wireless HID, in accordance with the present invention is considered a IEEE 802.11 compliant wireless HID device. Furthermore, the HID, in accordance with exemplary embodiments of the present invention does not necessarily support BSS mode of operation when the WLAN terminal is associated with a AP. Furthermore and in accordance with exemplary embodiments of the present invention, the WLAN terminal of the IEEE 802.11 capable WSTA is able to receiving one or several data frames from the wireless HID independently on which mode of operation the WLAN terminal is using i.e. BSS mode (infrastructure mode) or IBSS mode (independent mode) or mixed mode (i.e. IBSS and BSS mode) or unconnected mode i.e. active but not connected to any AP or any WLAN network.

According to an aspect of embodiments of the present invention, the above stated problem is solved by means of a method for enabling a WLAN terminal to communicate with a HID, over a wireless channel, the WLAN terminal comprising a radio transceiver adapted to operate in accordance with a communications WLAN standard protocol. The method comprises: receiving, over the wireless channel and directly from the HID, at least one data frame being compliant with said WLAN standard protocol and being received even when the WLAN terminal is associated with an access point in an infrastructure mode; determining from the one or several data frames a medium access control (MAC) address of the WLAN terminal and the identity of the wireless channel that is used; and delivering the data frame(s) to an application running on the WLAN terminal for processing data in said at least one frame. A data frame which can be a unicast or a broadcast MAC management frame includes one or several reserved data fields corresponding to one or several information elements (IE) comprising HID data.

According to some embodiments of the present invention, when the WLAN terminal is associated with an AP in an infrastructure (or BSS) mode, the above mentioned method allows the WLAN terminal to receive from the HID, one of several management frames unencrypted from the HID even if the data communications between the AP and the WLAN terminal is encrypted. The unencrypted management frames are compliant with the WLAN standard protocol. Thus, the application running on the WLAN terminal is capable in handling both encrypted frames from the AP and unencrypted management frames from the HID.

In addition, the HID data of the IE that is received from the HID can be encrypted although the remaining data information in the rest of the management frame is received unencrypted. Thus, only part(s) of the MAC management frame transmitted by the HID can be encrypted for protecting sensitive HID data against e.g. eavesdropping.

According to another aspect of embodiments of the present invention, the stated problem is solved by means of a WLAN terminal comprising a radio transceiver adapted to operate in accordance with the WLAN standard protocol and is further adapted to communicate wirelessly with a HID. The radio transceiver of the WLAN terminal is configured, as mentioned earlier, to receive directly from the HID at least one data frame (e.g. MAC management frame) being compliant with the WLAN standard protocol. The frame(s) is/are received even when the WLAN terminal is operating in a BSS mode, i.e. associated with an AP. The WLAN terminal is further configured to determine the MAC address indicated in the received frame(s) and is further configured to deliver the frame(s) to an application running on the WLAN terminal for processing data in the frame(s).

According to yet another aspect of embodiments of the present invention, the stated problem is solved my means of a HID which is capable in communicating wirelessly with a WLAN terminal using a communications WLAN standard protocol (i.e IEEE 802.11). The HID comprises a radio transceiver adapted to transmit and receive data from the WLAN terminal. The transceiver of the HID is adapted to transmit to the WLAN terminal at least one data frame compliant with said WLAN standard protocol even when the WLAN terminal is associated with an access point in an infrastructure mode. The data frame comprising the MAC address of the WLAN terminal are intended for an application running on the WLAN terminal which processes the data included in the data frame.

An advantage with the present invention is that unnecessary increase of power consumption of the WLAN terminal and the HID is avoided.

Another advantage with the present invention is that hardware and software complexity/resources is reduced thereby resulting in lower cost.

The present invention will now be described in more detail by means of various exemplary embodiments and with reference to the accompanying drawings. Other features, objects and advantages will also become apparent from the description, the drawings and the appended claims, attention to be called to the fact, however, that the following drawings are illustrative only, and that changes may be made in the specific embodiments illustrated and described within the scope of the appended claims.

DETAILED DESCRIPTION OF THE INVENTION

The invention is described in a general context in relation to a WLAN communication system such as IEEE 802.11 (Institute of Electrical and Electronics Engineers) systems. The present invention is not restricted to WLAN only i.e. it can be applied in systems wherein WLAN devices and short range radio frequency (RF) communication devices in e.g. a PAN (Personal Area Network) can operate concurrently. An example of a short range RF communication device is a Bluetooth device, a ZigBee device etc.

Figure 1:
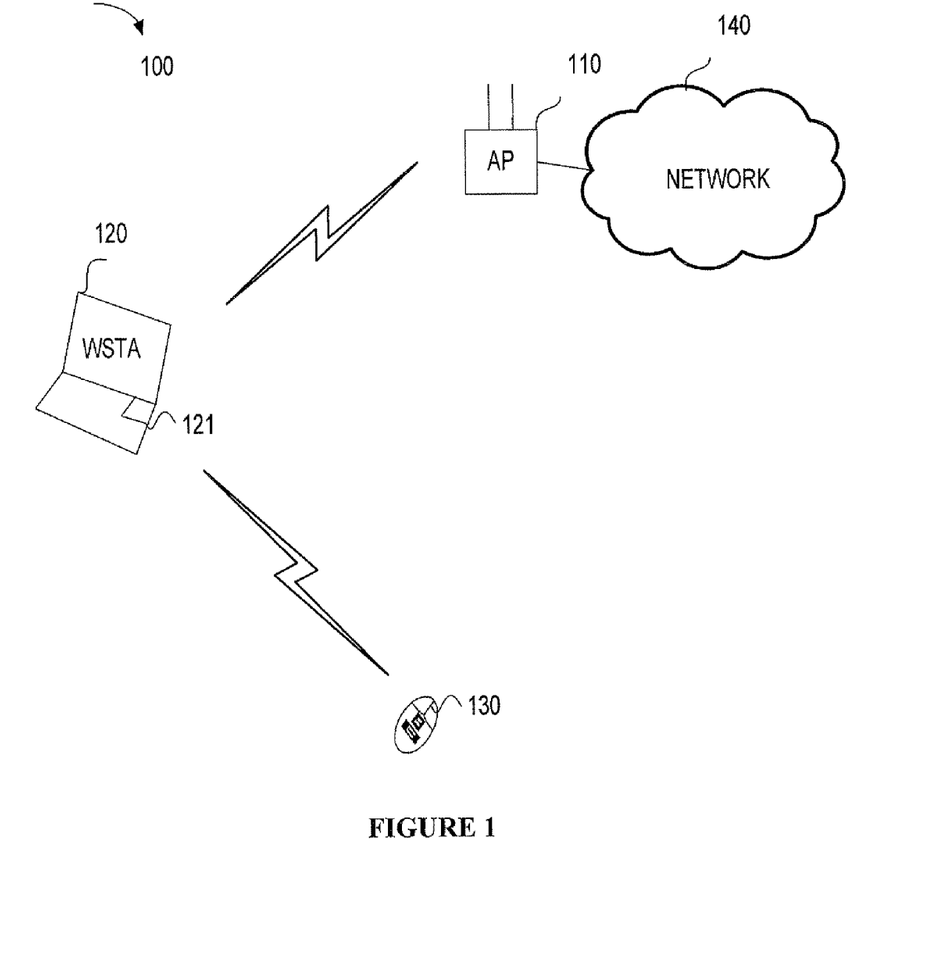
FIG. 1 is a schematic block diagram illustrating a Wi-Fi or a WLAN communication network wherein an exemplary embodiment of the present invention can be applied.

Referring to FIG. 1, there is illustrated a simplified block diagram of a WLAN communication network wherein an exemplary embodiment of the present invention can be applied. As shown, the network 100 comprises a access point (AP) 110 which is for example connected to another network 140 such as Internet. FIG. 1 also depicts a WLAN wireless host station (WSTA) 120 illustrated here as a laptop. It should be mentioned that the WSTA is IEEE 802.11 capable. Furthermore, the WSTA 120 may or may not be Wi-Fi (Wireless Fidelity) certified. The exemplary embodiments of the present invention are therefore applicable for both certified and non-certified WSTA stations.

It should be noted that that the WSTA 120 is not necessarily a laptop and can be represented by a WLAN capable mobile phone or a WLAN capable PDA or any other suitable WLAN capable device.

Referring back to FIG. 1, the WSTA 120 comprises a WLAN terminal 121 which incorporates a WLAN radio transceiver or a WLAN communication unit (not shown) such as network interface card (NIC) for wireless access to the WLAN network 100. As shown in FIG. 1, the WSTA 120 is wirelessly connected to the AP 110 after e.g. authentication and association according to .g. IEEE 802.11 Basic Service Set (BSS) mode i.e. the WSTA 120 is operating in an infrastructure mode.

The WSTA 120 may support numerous Human Interface Devices (HID) like a computer mouse, a keyboard, a microphone etc. In FIG. 1 the HID is represented by a wireless computer mouse 130. The wireless HID 130 is here considered IEEE 802.11 compliant i.e. it can communicate in accordance with the WLAN standard protocol IEEE 802.11. For that purpose the wireless HID 130 also comprises a WLAN radio transceiver or a WLAN communication unit (not shown) for transmitting and receiving data frames over the wireless channel. It should be mentioned that the wireless IEEE 802.11 HID 130 may or may not be Wi-Fi (Wireless Fidelity) certified. The exemplary embodiments of the present invention are therefore applicable for both certified and non-certified IEEE 802.11 HIDs. In the following description, by wireless HID is meant wireless IEEE 802.11 HID or IEEE 802.11 HID which, as mentioned above, may or may not be Wi-Fi certified.

In FIG. 1 the WSTA 120 is associated with the AP 110 in the BSS mode over a wireless channel. According to an embodiment of the present invention, the WLAN radio transceiver of the WLAN terminal 121 is configured to receive, over the wireless channel, and directly from the wireless HID 130, data frames even though the WSTA 120 is operating in the BSS mode. Note here that the wireless HID 130 does not necessarily support BSS mode of operation when the WSTA 120 is operating in the BSS mode.

The data frame (or frames) comprises the MAC address of the WLAN terminal 121 and the identity of the wireless channel used. Thus, when the WLAN terminal 121 (or the WSTA 120) receives a data frame it determines the MAC address and the channel indicated in the frame. The WLAN terminal 121 is further configured to deliver the received frames to an application running on the WSTA 120 (or the WLAN terminal) which processes the data included in the frame. The communication between the WLAN terminal 121 (or the WSTA 120) and the wireless HID 130 is based on broadcast or unicast management frames which are compliant with the WLAN standard protocol i.e. the IEEE 802.11 protocol.

According to an embodiment of the present invention, a broadcast management frame (like beacon frame) or a unicast management frame is transmitted from wireless HID 130 unencrypted and received directly by the WLAN terminal 121 even if encryption and privacy is enabled between the WLAN terminal 121 and the AP 110. Furthermore, the communication channel between the wireless HID 130 and the WLAN terminal 120 has the same channel identity as the one used for communication between the AP 110 and WLAN terminal 120. The type of management frame (broadcast or unicast) that is transmitted depends on e.g. the application that is running on the WSTA or on the WLAN terminal.

The management frame received by the WLAN terminal 121 from the wireless HID 130 can be used to stream data related to the supported function (application) of the wireless HID 130. As an example, since the wireless HID 130 of FIG. 1 is a wireless mouse, the transmitted management frame may comprise HID data in the form of displacement data, right of left mouse key pressing information data and wheel scrolling data. If the wireless HID is a wireless keyboard, the HID data may comprise information indicative of the key(s) that is/are stroke by the user of the keyboard. The present invention is not restricted to a mouse HID or a keyboard HID i.e. any other type of wireless HID can be used.

Figure 2:
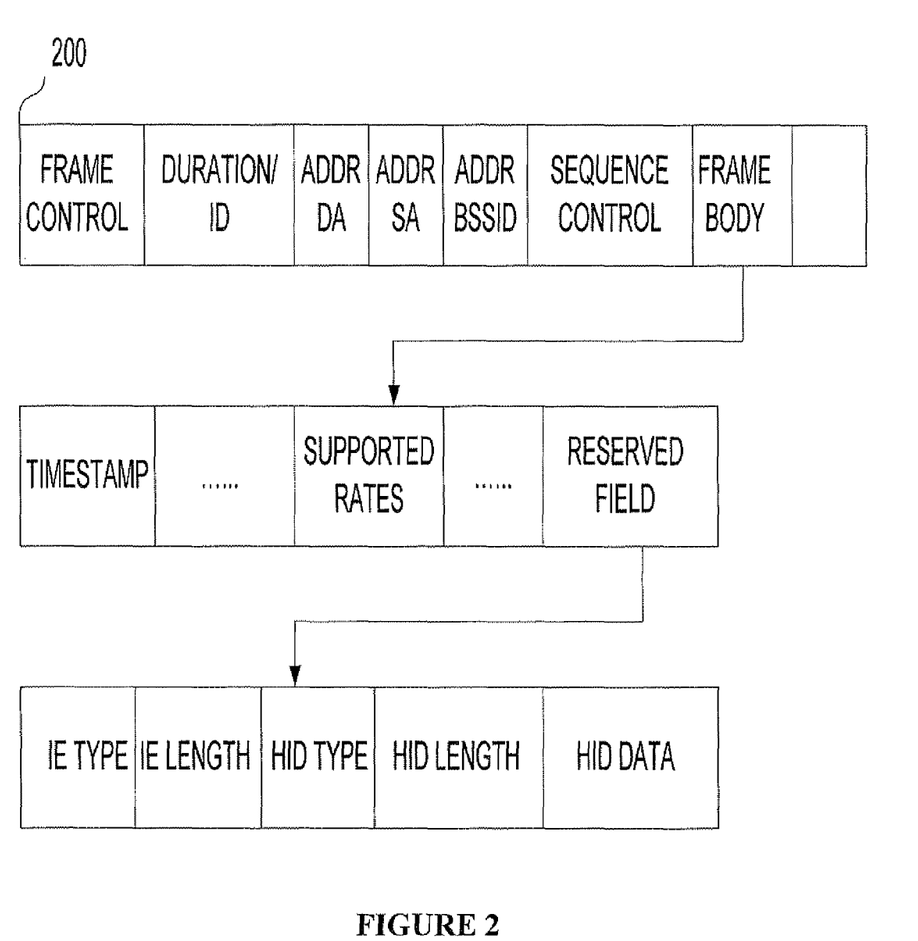
FIG. 2 is a schematic block diagram illustrating an exemplary format of a management frame that can be communicated between a HID and a WLAN terminal according to an embodiment of the present invention.

Referring to FIG. 2, there is illustrated an exemplary format of a management data frame which can represent a unicast probe response frame 200. The management frame 200 is a MAC frame. It should be noted that probe response frames can be received by a WSTA from various APs while the WSTA is connected to a certain network (or AP). The management data frame 200 shown in FIG. 2 comprises an information element (IE) which is a reserved data field that can be used to encapsulate HID data described above. The format of the probe response frame shown in FIG. 2 is an example of a management frame the wireless HID 130 of FIG. 1 can transmit directly to the WLAN terminal 121 in accordance with an exemplary embodiment of the present invention.

As shown in FIG. 2, the management data frame 200 comprises:
  a Frame Control Field which holds information on how to read the subsequent fields.
  a Duration/ID Field which is used by the device to get buffered frames.
  The address fields comprising at least SA, DA and BSSID where:
    Source address (SA) is the MAC address of the device which originated this management frame.
    Destination address (DA) is the MAC address of the destination device.
    BSSID (Basic Service Set Identifier) is a unique identifier for a particular BSS. This field is used to identify one BSS from another. In e.g. an infrastructure BSS, the BSSID is the MAC address of the AP. In an Ad-Hoc (or independent BSS) network the BSSID is determined by the first device in the IBSS. Note that since, according to the present invention, the wireless HID directly transmits the management frame to the WSTA, the BSSID is determined by the HID. As an example, the BSSID can be given the MAC address of the SA device which is the MAC address of the wireless HID.
  Sequence Control Field which allows a device to avoid duplicate frames.
  Frame Check Sequence Field (FCS) is a field including the result of applying the CRC (Cyclic Redundancy Check) function that can be used as a checksum to detect errors in data transmission.
  Frame Body Field comprises the actual data or management information data. This field comprises the above mentioned reserved data field in which HID data can be encapsulated. Thus this field holds one or more information elements (IE).
    Furthermore, this field, in accordance with exemplary embodiments of the present invention can encapsulate unencrypted HID data or encrypted HID data. It should be noted that IEs are a device's way to transfer descriptive information (data) about itself inside management frames. An IE comprises a subfield indicating the element ID; another subfield indicating the length of the IE and a further subfield indicating the data information.

Thus if the device is a wireless mouse, the wireless mouse can transfer HID data information about itself. As an example, the IEs can be used to transmit the form of displacement data, right of left mouse key pressing information data and wheel scrolling data. In accordance with exemplary embodiments of the present invention, each data frame transmitted by the wireless HID is fully compatible with the IEEE 802.11 standard as it does not require any modification in the format of the management frames since it uses IE structures that are already available for the IEEE 802.11 standard protocol.

The frame body field comprises other fields like a timestamp subfield, a subfield indicating the supported rates etc. Not all subfields of the frame body are shown. The reserved data field in the frame body field including IEs comprises a field indicating a IE type; a field indicating a IE length; a HID data field of the IE, a field for indicating the HID type (mouse, keyboard or other input device(s)), a field for indicating the HID length which is used to store the required HID data length and the HID data value of the actual HID data. This way a maximum number of up to 255 HIDs can be supported simultaneously. A simplified format of the frame body is also shown in FIG. 2. The subfield of the frame body that includes the IE(s) is also shown.

Figure 3:
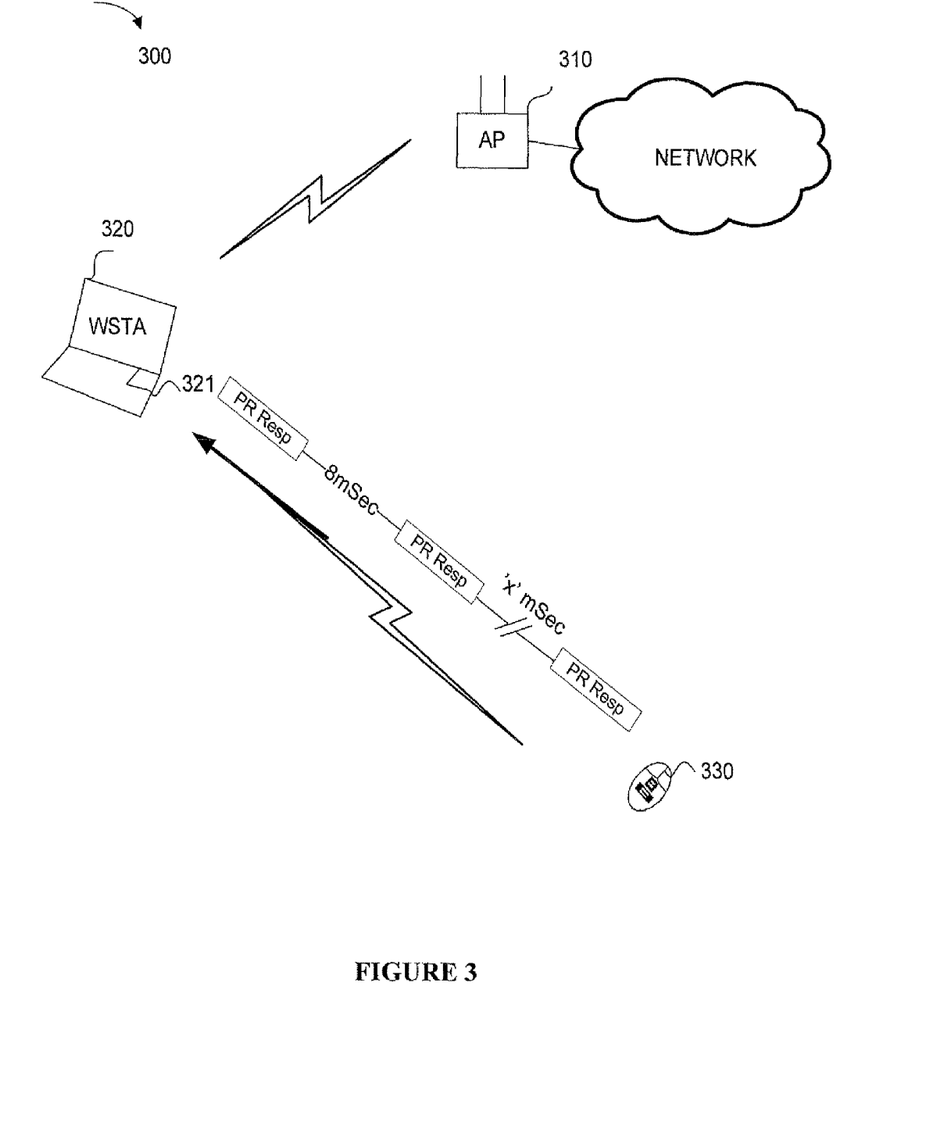
FIG. 3 is a schematic block diagram illustrating a Wi-Fi or a WLAN communication network wherein an exemplary embodiment of the present invention can be applied.

Referring to FIG. 3 there is illustrated an exemplary and simplified block diagram of a IEEE 802.11 compliant WLAN communication network 300 wherein a wireless HID in the form of a wireless computer mouse 330 is streaming management frames to a WSTA 320 (or the WLAN terminal 321 of the WSTA 320) which encapsulate the displacement data of the mouse. In this exemplary scenario, the management data frame is a probe response frame. Note that the exemplary embodiments of the present invention are not restricted to a management frame corresponding to a probe response frame i.e. other types of management data frames can also be used such as: beacon frame; probe request frame, authentication frame, de-authentication frame, association request frame, association response frame, re-association request frame, re-association response frame, disassociation frame etc. . . .

Referring back to FIG. 3, the probe response frame is shown transmitted directly from the wireless HID 330 to the WSTA 320 i.e. without passing via the AP 310 even if the WSTA 320 is associated with the AP 310, as shown in FIG. 3.

As illustrated, the period 'x' between two consecutive probe responses can e.g. be equal to 8 msec or any other suitable time value. It should be noted that a period of 8 msec between consecutive frames is most suitable in case the wireless HID is a wireless mouse and this period of 8 ms corresponds to continuous HID (i.e. mouse) operation. The period may be higher than 8 msec in case of mouse inactivity. During that period, the wireless HID 330 can go into sleep mode, thereby saving power since no frames or packets from the WSTA 320 are expected.

It should be noted that for other types of wireless HIDs, the minimum time interval between consecutive frames could be larger than 8 msec. As an example, for voice service, 20 or 40 msec can be a period used between frames. The exemplary embodiments of the present invention are therefore not restricted to a wireless HD corresponding to a wireless mouse.

Referring back to FIG. 3, as the WSTA 320 (or the WLAN terminal 321 in the WSTA 320) receives said frames from the wireless HID 330, it determines the MAC address of the WLAN terminal and the channel identity and delivers them to an application running on the WLAN terminal 321 which processes the HID data in the frames i.e. it processes e.g. displacement data, right of left mouse key pressing information data and/or wheel scrolling data.

According to an exemplary embodiment of the present invention, the HID data can be encrypted but the rest of the management frame is not necessarily encrypted. As an example, if the wireless HID is a wireless keyboard and the HID data relates to sensitive information that the user enters, the HID data can be encrypted for increasing security but the rest of the management frame does not have to be encrypted. This way, sensitive information (i.e. the HID data) cannot be easily picked up by an eavesdropper. Furthermore, the WSTA 320, although operating in an infrastructure mode, it's communication with the AP 310 can be encrypted or unencrypted independently on whether the HID data received from the wireless HID 330 is encrypted or not.

Any known encryption method can be used e.g. Advanced Encryption Standard (AES), Wired Equivalent Privacy (WEP), Wi-Fi Protected Access (WPA or WPA2) etc.

It should be noted that the present invention is not restricted to the case where the WSTA is operating in an infrastructure mode. In other words, the communication between the wireless HID and the WSTA is advantageously independent on the wireless networking mode of the WSTA. As an example, any of the following networking modes of the WSTA can be used and still the WSTA can receive management frames directly from the wireless HID:

(a) the WSTA can be connected to a WLAN network in infrastructure mode (i.e. BSS mode) as shown in FIG. 3.
(b) the WSTA can be connected to a WLAN network in an independent mode (i.e. IBSS mode).
(c) the WSTA can be active but not connected to any WLAN network (i.e. neither BSS nor IBSS modes). In this mode, the WSTA may be in scan mode trying to find a WLAN network to connect to.
(d) the WSTA can be connected simultaneously in BSS and in IBSS mode. In this case the WSTA can be connected to an AP in BSS mode and to e.g. a peripheral device such as a headset in a IBSS mode or to another WSTA using for example Bluetooth.

Figure 4:
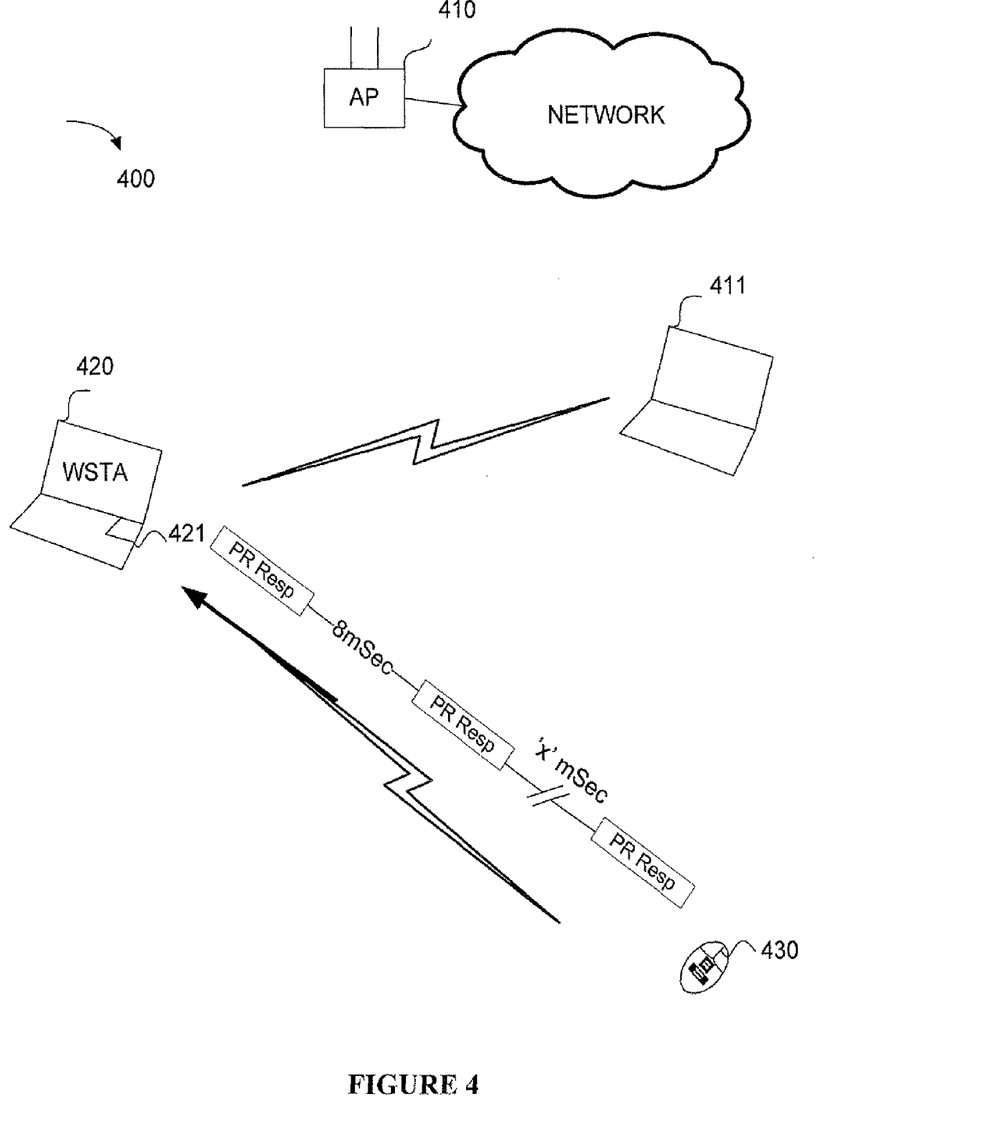
FIG. 4 is a schematic block diagram illustrating a Wi-Fi or a WLAN communication network wherein another exemplary embodiment of the present invention can be applied.

Referring to FIG. 4 there is illustrated a WLAN (e.g. Wi-Fi) network 400 wherein the WSTA 420 is operating in IBSS mode (mode b above), and is capable in communicating with another WSTA 411 using e.g. Bluetooth. As shown, the WSTA 420 including the WLAN terminal 421 is not associated with the AP 410, here indicated by not having a channel between the AP 410 and the WSTA 420. The WSTA 420 is shown receiving management frames from a wireless HID 430 (computer mouse or keyboard or other input device). The management frames here represented by probe responses comprise the MAC address of the WSTA 420 or WLAN terminal 421 (i.e. the destination device) and the identity of the wireless channel and are further delivered to an application running on it for processing HID data in the received management frames.

Figure 5:
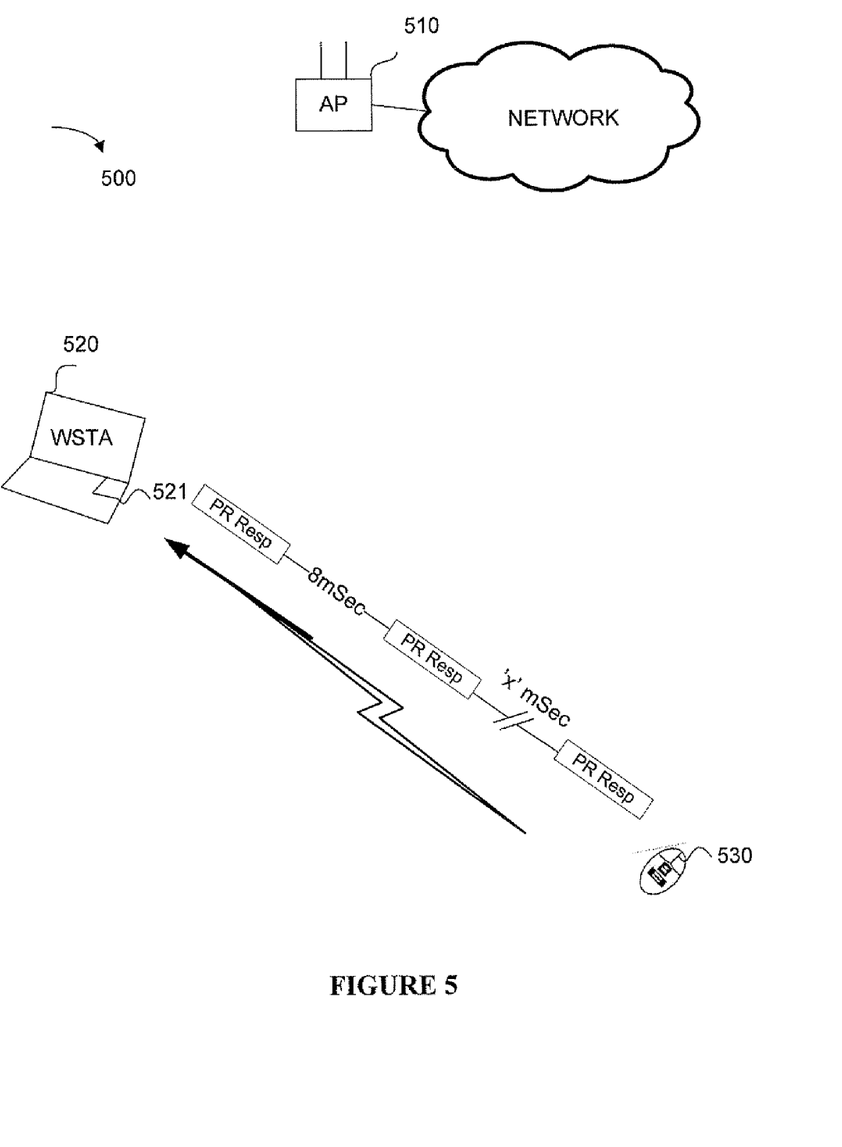
FIG. 5 is a schematic block diagram illustrating a Wi-Fi or a WLAN communication network wherein yet another exemplary embodiment of the present invention can be applied.

Referring to FIG. 5 there is illustrated a WLAN network 500 wherein the WSTA 520 (or the WLAN terminal 521) is operating in an unconnected mode (mode c above) and is shown receiving management frames (e.g. probe responses) from a wireless HID 530. Again, the WSTA 520 is not connected to the AP 510.

Figure 6:
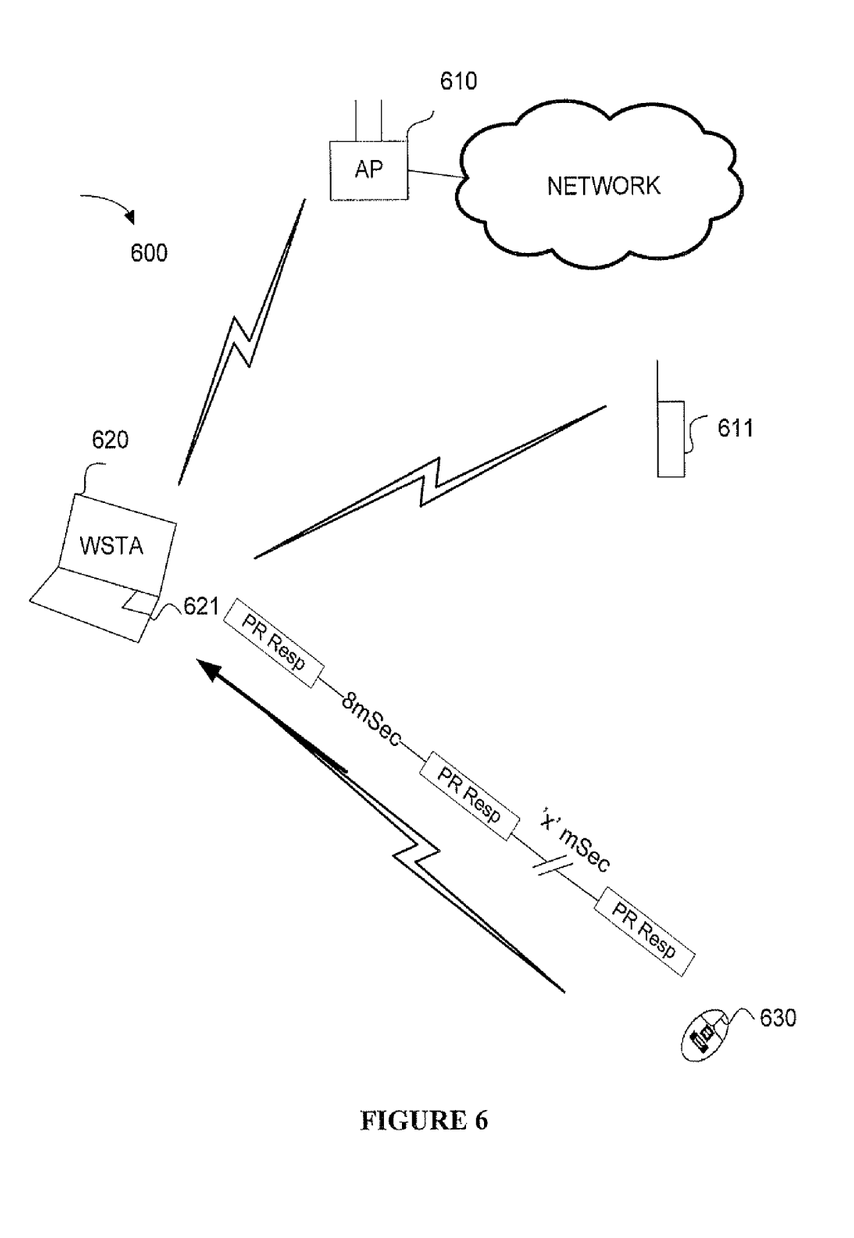
FIG. 6 is a schematic block diagram illustrating a Wi-Fi or a WLAN communication network wherein a further exemplary embodiment of the present invention can be applied.

Referring to FIG. 6 there is illustrated a WLAN network 600 wherein the WSTA 620 is connected simultaneously in BSS mode (i.e. with the AP 610) and IBSS mode (i.e. with e.g.

a mobile phone 611 using Bluetooth). As described above, the WSTA 620 (or the WLAN terminal 621 in the WSTA) is capable in receiving directly from the wireless HID 630 management frames (e.g. probe responses) which are processed as described earlier.

In all network scenarios described above, the HID data can be encrypted while the remaining data in the management frame is not or the whole management frame can be sent unencrypted. Furthermore, any suitable type of management frame can be used i.e. the present invention is not restricted to probe responses.

Figure 7:
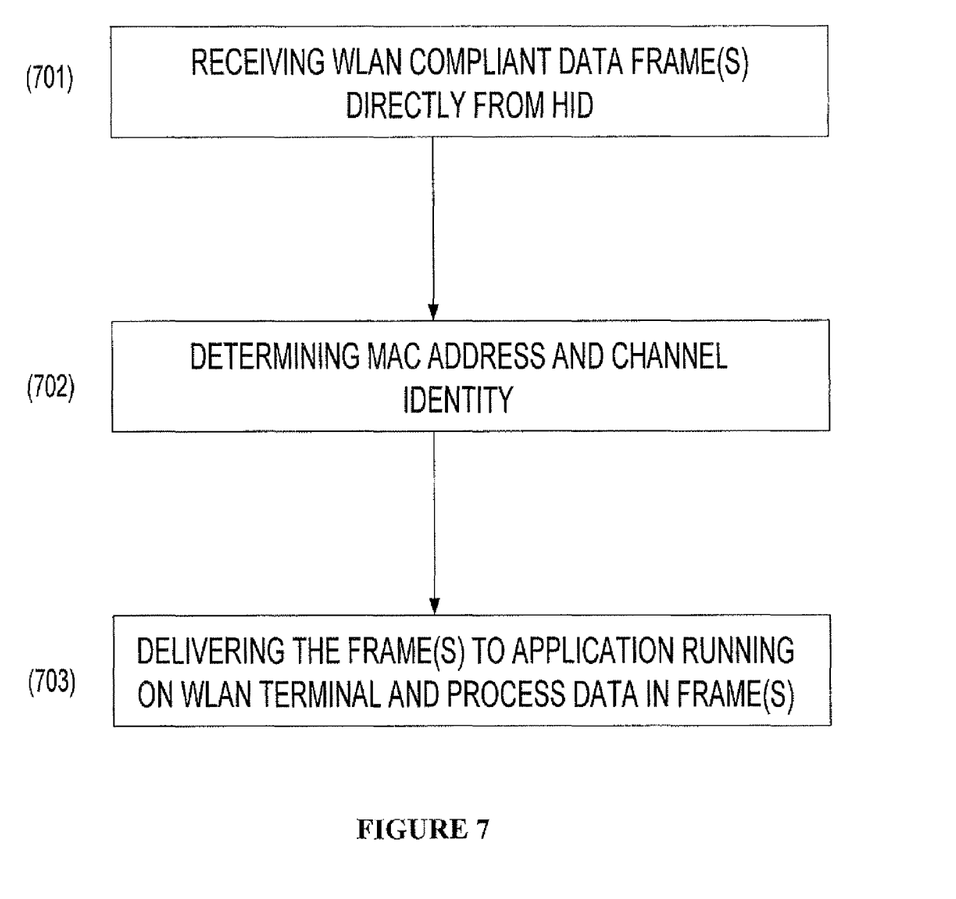
FIG. 7 illustrates a flowchart of a method for enabling a WLAN terminal to communicate with a HID according to exemplary embodiments of the present invention.

Referring to FIG. 7 there is illustrated a flowchart summarizing the main steps of a method for enabling a WLAN terminal of a WSTA to communicate with a wireless HID in accordance with the previously described exemplary embodiments of the present invention. The WLAN terminal includes a radio transceiver adapted to operate in accordance with the WLAN standard protocol (e.g. IEEE 802.11a and/or b and/or g). The main steps performed at the WLAN terminal comprise:

(701) receiving, over a wireless channel, and directly from the wireless HID at least one data frame (e.g. a management data frame) being compliant with the WLAN standard protocol. The frame or frames is/are received even when the WLAN terminal is associated with an AP in an infrastructure mode.

(702) determining from the received frame the MAC address of the WLAN terminal and the identity of the wireless channel (703) delivering the frame(s) to an application for processing data in the frame(s).

The method in accordance with an embodiment of the present invention may further comprise a pairing procedure which enables the WSTA (or the WLAN terminal of the WSTA) to receive the MAC address of the wireless HID and further store said MAC address in e.g. a HID profile list. As an example, the WSTA receives one or several management frames in which the source address (SA) field includes the MAC address of the HID. Any known paring procedure can be used i.e. the present invention is not restricted to any particular pairing procedure.

Figure 8:
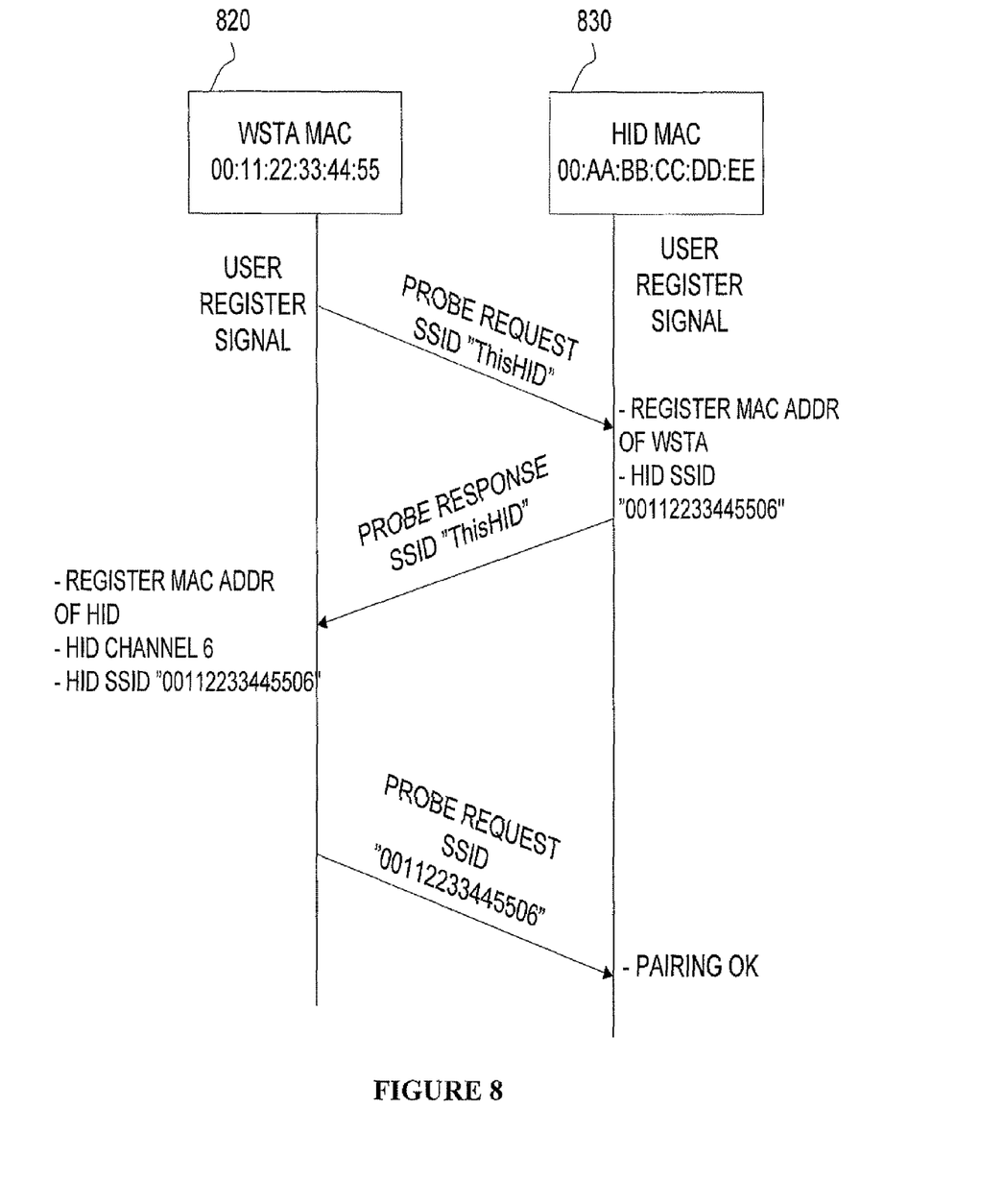
FIG. 8 illustrates an exemplary pairing procedure between the HID and the WLAN terminal in accordance with an exemplary embodiment of the present invention.

Referring to FIG. 8 there is illustrated an example of a pairing procedure that can be used between the WSTA 820 (or the WLAN terminal) and the wireless HID 830. As shown, the WSTA 820 has e.g. a MAC address 00:11:22:33:44:55 and the HID 830 has e.g. a MAC address 00:AA:BB:CC:DD:EE. The HID may have a managed mode that e.g. accepts only probe requests comprising a SSID string.

The exemplary pairing procedure shown in FIG. 8 comprises:
1. USER REGISTER SIGNAL at WSTA 820: The WSTA 820 sends a probe request including a SSID string, denoted "ThisHID" in FIG. 8. This is performed in order to register the WSTA MAC address in the HID.
2. USER REGISTER SIGNAL at HID 830: REGISTER MAC 00:11:22:33:44:55 of WSTA 820 (or the WLAN terminal of the WSTA 820) and HID SSID 00112233445506, where 06 corresponds to the channel ID. The MAC address of the WSTA 820 is now registered in the HID 830. The HID 830 then transmits a PROBE RESPONSE frame including the same SSID i.e. "ThisHID" to the WSTA 820. The reception of this frame will confirm the existence of the HID 830 and will trigger the registration of the HID MAC address and e.g. operational BSSID and SSID string.
3. The WSTA 820 may confirm the HID's registration by sending a PROBE REQUEST frame constructed using the previously exchanged information e.g. BSSID, MAC address SSID and e.g. the channel ID. After reception of the PROBE REQUEST by the wireless HID 830 the pairing is successfully performed (PAIRING OK).

In the pairing procedure described above it was assumed that the channel used is known. However, configuration of the channel and other data can be performed through a synchronization procedure in accordance with an exemplary embodiment of the present invention as will be described below.

It should be noted that the pairing procedure is not required i.e. the method described above can be performed without initially performing a pairing between the WSTA and the HID.

As mentioned, the method in accordance with an embodiment of the present invention also comprises a channel synchronization procedure in order for the wireless HID to be able to determine the radio frequency channel that the WSTA is using when the WSTA is operating in any of the previously described modes. The channel synchronization procedure can take place every time the WSTA attempts to change a channel or changes a channel or the wireless HID wakes up after a period in sleep mode and in general whenever the WSTA determines that the communication is idle for a period exceeding a predetermined minimum time threshold.

Figure 9:
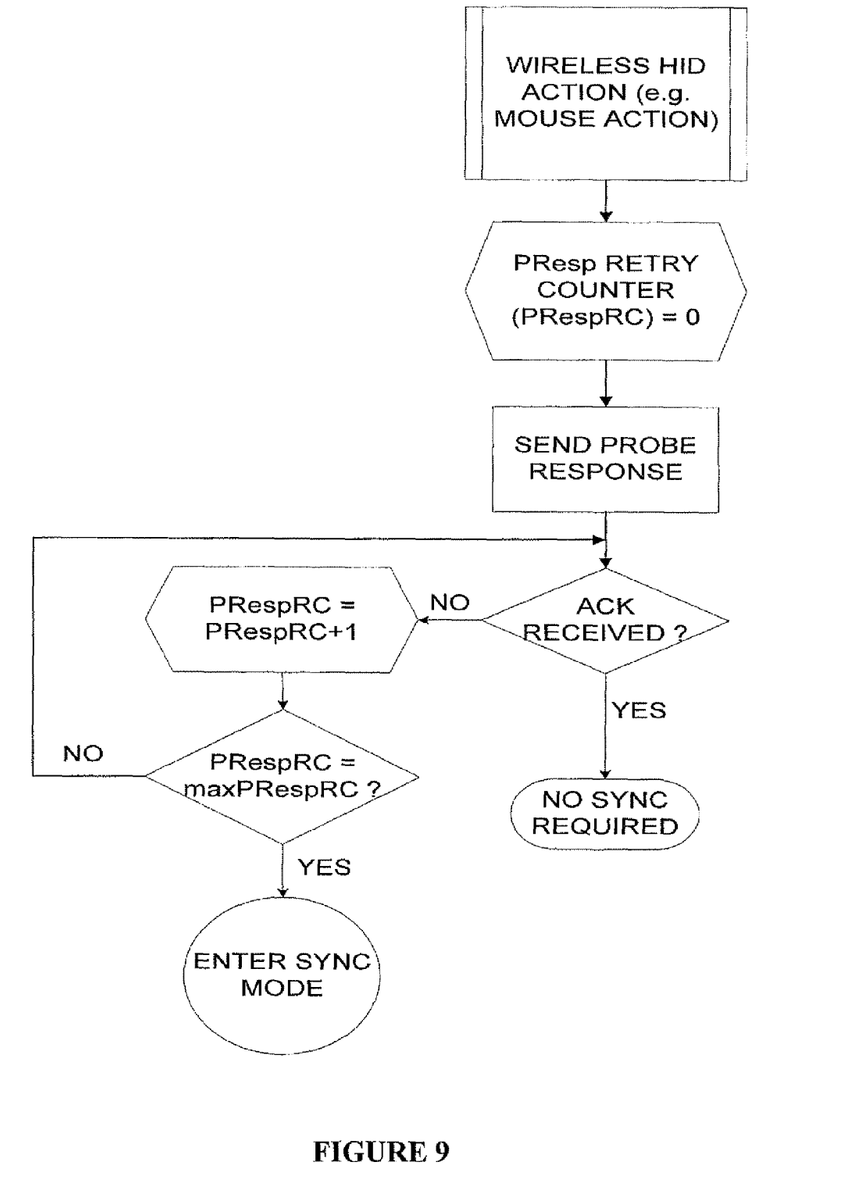
FIG. 9 illustrates an exemplary synchronization procedure between the wireless HID and the WLAN terminal in accordance with an exemplary embodiment of the present invention.

The channel synchronization procedure may include channel detection and switching during the WSTA's startup and roaming scenarios. According to an exemplary embodiment of the present invention, the following actions may be performed:

The wireless HID (e.g. wireless mouse) is configured to decide to enter the SYNC (synchronization) mode when a maximum number of probe responses (PResp) retransmissions has been reached without ACK (acknowledgment) received, as it is shown in FIG. 9 in case the wireless HID is a wireless mouse. In FIG. 9, PRespRC denotes a probe response retry counter which is e.g. initially equal to zero. maxPRespRC denotes a predefined maximum number of PResp retransmissions without any ACK received. PRespRC is incremented for each retransmission attempt when no ACK is received. The value of maxPRespRC is a design parameter.

When the wireless HID enters SYNC mode it will try to detect, preferably in the shortest possible time, the new channel the WSTA (or the WLAN terminal) has switched to. Every time the wireless HID fails to detect the WSTA in a certain channel, the wireless HID is configured to switch to a new channel and try again. According to an exemplary embodiment of the present invention, the process for detecting a WSTA at a certain channel comprises the following steps:

1. The wireless HID configures its transceiver with the appropriate channel settings.
2. The wireless HID is configured to create a PResp (probe response) frame and transmit it in the selected channel waiting for ACK.
3. If an ACK is not received, it resends the PResp (step 2) until a maximum number or retransmissions has been reached or until an ACK is received.
4. If the maximum number of retransmissions has been reached, the WSTA has not been detected and the wireless HID will either switch to the next channel or will generate a SYNC FAIL indication if it has tried the detection method for all the channels in e.g. its list of channels without success.
5. If an ACK is received during the steps 2 and 3, then the following actions will be taken by the two parties (i.e. the WSTA and the wireless HID) in order to complete synchronization:

A software application running on the WSTA for the specific wireless HID, is configured to parse the contents of the PResp and it will initiate a transmission of a PReq (probe request) packet to said wireless HID. If the WSTA has received the PResp from an adjacent channel, the WSTA will determine it since the channel information is included in the received PResp packet. In this case, the WSTA is configured to first switch to the channel the HID has used for the transmission of the PResp and then transmits the PReq packet as it has been ordered by the software application. The PReq frame contains the information of the original channel that the WSTA has to switch back after the completion of the transmission.

The HID, upon the reception of the PReq, will detect the new channel of the WSTA and it will also switch to this new channel having successfully discovered the WSTA and achieved synchronization.

In order to minimize the discovery time, it is preferable, in accordance with an exemplary embodiment of the present invention, to apply a method for the selection of the next channel of step 4, after every failing attempt for discovery in a certain channel. So, the following actions may be performed:

1. The PResp packets are preferably transmitted by the HID with high output power so that a WSTA in a short distance from the wireless HID can listen to them even from adjacent channels.
2. The order that successive channels are selected should be such that it increases the probability for a faster discovery. As an example, an order of channels 3, 9, 12, 1, 6, . . . might be preferable over another sequence although this is application dependent. Note that the order of the channels is only an example.

It should be noted that the wireless HID is required to be powered up but only during e.g. pairing and data streaming. The above described synchronization procedure allows both WSTA (or WLAN terminal) and HID to enter into power save mode individually.

The exemplary embodiments of the present invention previously described related to a method for enabling a WLAN terminal (or a WSTA) to communicate with a wireless HID; and also related to an apparatus i.e. the WLAN terminal and further related to a wireless HID. The WLAN terminal and the HID comprise a radio transceiver for receiving and transmitting data as described and these apparatuses also comprise other hardware and software means not explicitly disclosed.

The present invention is not limited to a method and apparatuses (WLAN terminal and HID) i.e. it also discloses a computer program product comprising a computer usable medium and a software code means loadable into an internal memory storage within said e.g. the WLAN terminal according to present invention. The software code means operative, when loaded allows the WLAN terminal to execute the method steps according to anyone or a combination of the following appended method claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for enabling a Wireless Local Area Network (WLAN) terminal to communicate with a Human Interface Device (HID) over a wireless channel, the WLAN terminal comprising a radio transceiver adapted to operate in accordance with a communications WLAN standard protocol, wherein the method comprises:
   receiving, over the wireless channel and directly from the HID, wherein the HID is not directly associated with an access point, at least one unencrypted data frame being compliant with said WLAN standard protocol and being received even when the WLAN terminal is associated with the access point in an infrastructure mode, the at least one unencrypted data frame comprising an encrypted information Element (IE) that comprises HID data;
   determining from the at least one data frame a MAC address of the WLAN terminal and the identity of the wireless channel; and
   delivering said at least one data frame to an application running on the WLAN terminal for processing data in said at least one frame.

2. The method according to claim 1, wherein receiving comprises receiving said at least one data frame corresponding to at least one broadcast and/or unicast management frame depending on the application running on the WLAN terminal.

3. The method according to claim 2, wherein receiving further comprises receiving said at least one management frame even when the WLAN terminal is operating in an independent mode.

4. The method according to claim 2, wherein receiving further comprises receiving said at least one management frame even when the WLAN terminal is operating in an unconnected mode.

5. The method according to claim 1, wherein receiving comprises receiving said at least one management frame including at least one reserved data field corresponding to the IE.

6. The method according to claim 1, further comprises synchronizing with the HID when the WLAN terminal changes the wireless channel.

7. The method according to claim 1, further comprises pairing with the HID in order to register the MAC address of the HID in a HID profile list.

8. A WLAN terminal comprising a radio transceiver adapted to operate in accordance with a communications WLAN standard protocol and further adapted to communicate, over a wireless channel, with a Human Interface Device (HID), wherein:
   the radio transceiver is adapted to receive over the wireless channel and directly from the HID, wherein the HID is not directly associated with an access point, at least one unencrypted data frame being compliant with said WLAN standard protocol and being received, by said radio receiver, even when the WLAN terminal is associated with the access point in an infrastructure mode, the at least one unencrypted data frame comprising an encrypted information Element (IE) that comprises HID data;
   the WLAN terminal is further configured to determine from the at least one data frame a MAC address of the WLAN terminal and the identity of the wireless channel; and the WLAN terminal is further configured to deliver said at least one data frame to an application running on the WLAN terminal for processing data in said at least one frame.

9. The WLAN terminal according to claim 8, wherein the at least one received data frame corresponds to at least one broadcast and/or unicast management frame depending on the application running on the WLAN terminal.

10. The WLAN terminal according to claim 9, wherein the radio transceiver is configured to receive said at least one management frame even when the WLAN terminal is operating in an independent mode.

11. The WLAN terminal according to claim 9, wherein the radio transceiver is configured to receive said at least one management frame even when the WLAN terminal is operating in an unconnected mode.

12. The WLAN terminal according to claim 9, is further configured to synchronize with the HID when the WLAN terminal changes the wireless channel and is further configured to pair with the HID in order to register the MAC address of the HID in a HID profile list.

13. The WLAN terminal according to claim 9, wherein the at least one management frame includes at least one reserved data field corresponding to the IE.

14. A Human Interface Device (HID) comprising a radio transceiver adapted to operate in accordance with a communications Wireless Local Area Network (WLAN) standard protocol and further adapted to communicate, over a wireless channel, with a WLAN terminal, wherein:
the radio transceiver is adapted to transmit over the wireless channel and directly to the WLAN terminal, at least one unencrypted data frame being compliant with said WLAN standard protocol, said radio transceiver is adapted to transmit said at least one data frame even when the WLAN terminal is associated with an access point in an infrastructure mode, the at least one encrypted data frame comprising an encrypted information Element (IE) that comprises HID data; and
the HID is not directly associated with the access point.

15. The HID according to claim 14, wherein said at least one transmitted data frame corresponds to at least one broadcast and/or unicast management data frame.

16. The HID according to claim 14, wherein the at least one management frame includes at least one reserved data field corresponding to the IE.

17. The method according to claim 2, wherein receiving comprises receiving said at least one management frame unencrypted from the HID even when encryption is enabled for communications between the access point and the WLAN terminal when the WLAN terminal is operating in an infrastructure mode.

18. The WLAN terminal according to claim 9, wherein the radio transceiver is configured to receive said at least one management frame unencrypted from the HID even when encryption is enabled for communications between the access point and the WLAN terminal when the WLAN terminal is operating in an infrastructure mode.

* * * * *